Aug. 22, 1967     LE ROY CAUDELL     3,337,061
DRIVE-IN STORAGE RACK
Filed Sept. 27, 1965
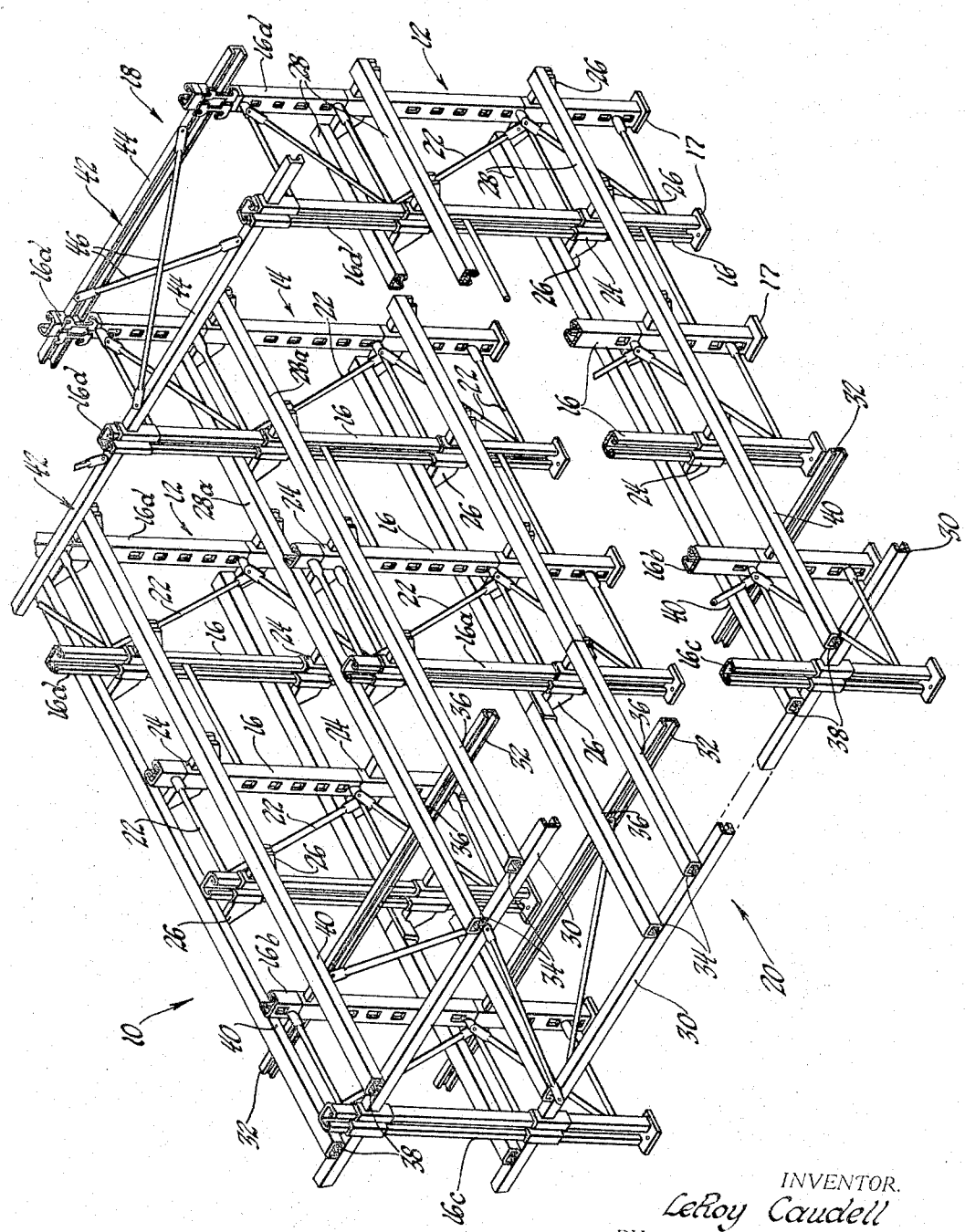
INVENTOR.
LeRoy Caudell
BY
Barnard, McGlynn & Reising
ATTORNEYS

United States Patent Office 3,337,061
Patented Aug. 22, 1967

3,337,061
DRIVE-IN STORAGE RACK
Le Roy Caudell, Farmington, Mich., assignor, by mesne assignments, to Storage Systems, Inc., Detroit, Mich., a corporation of Michigan
Filed Sept. 27, 1965, Ser. No. 490,208
10 Claims. (Cl. 211—134)

ABSTRACT OF THE DISCLOSURE

A drive-in storage rack of the type wherein a vehicle may be driven thereinto for depositing a pallet for support by the rack and, more particularly, to a rack comprising at least three parallel rows of vertical posts extending from a first end of the rack with the last post in the middle row being displaced from the second end of the rack, brace members extending between and interconnecting the last post of the outer rows on either side of the middle row, and horizontal load carrying beams extending along the respective rows with the load carrying beams of the middle row extending from the last post therein for attachment to and support by the brace members.

---

Storage racks of the instant type are utilized in warehouses and the like for supporting pallets which are loaded with goods and moved about by a fork lift truck. A fork lift truck may carry a loaded pallet into such storage racks and deposit the pallet on the storage racks for support thereby. Such storage racks are utilized so that it is not necessary to stack loaded pallets one on top of another, which stacking frequently causes damage to the goods on the respective pallets due to the weight of the pallets stacked on the goods of the lower pallets. By utilizing storage racks of the instant type, each pallet is individually supported by the storage rack and the goods on each respective pallet do not support the weight of other pallets stacked thereon.

Storage racks of the instant type are made up of large heavy-duty structural members and each additional heavy-duty structural member which must be utilized in the fabrication of storage racks of the instant type complicates the assembly of the rack and increases the expense of the rack. It is, therefore, important that storage racks of the instant type be easily assembled and be characterized by the maximum efficiency in the use of material commensurate with the expected load requirements.

Accordingly, it is an object and feature of this invention to provide a drive-in storage rack of the type for supporting pallets which is constructed with the maximum efficient use of materials while providing the required strength characteristics.

Yet another object and feature of this invention is to provide a drive-in storage rack of the type for supporting pallets which is less complex and therefore more easily assembled than heretofore known storage racks.

In general, these and other objects and features of this invention may be attained by a drive-in storage rack including at least three parallel rows of posts with a middle row disposed between first and second outer rows and at least one load carrying beam attached to and extending along each of the rows for supporting a pallet between load carrying beams of adjacent rows of posts. The first and second outer rows of posts each include at least one additional post more than the middle row with a brace attached to and interconnecting the additional posts so as to extend between the outer rows. The load carrying beams which are attached to the middle row extend from the last post in the middle row and are attached to the brace so that they are supported thereby.

Other objects and attendant advantages of this invention will be readily appreciated as the same becomes better understood by reference to the following detailed description when considered in connection with the accompanying drawings wherein the single figure of the drawings illustrates a preferred embodiment of the instant invention.

A drive-in storage rack of the type wherein a vehicle may be driven thereinto for depositing a pallet for support thereby is generally shown at 10. Normally, the vehicles which are driven into such a storage rack are fork lift trucks for moving pallets.

The storage rack 10 includes a plurality of parallel rows, generally shown at 12 and 14, of vertical posts 16. Each post 16 is attached to or rests upon a base plate 17. Although only three rows are illustrated in the figure, the storage rack of the instant invention may include any number of rows of vertical posts 16. The respective rows 12 and 14 are disposed between a first end of the rack, generally shown at 18, and a second end of the rack, generally shown at 20.

At least one of the rows, preferably and normally every other row, is a short row 14 since the last post 16a therein, which is the closest post of the short row 14 to the second end 20 of the rack 10, is inwardly displaced from the second end 20 of the rack 10.

There is at least one and preferably two or more end posts 16b and 16c disposed in each of the rows 12, which rows 12 are next adjacent to the short row 14. The end posts 16b and 16c are disposed closer to the second end 20 of the rack than the last post 16a of the short row 14. The respective posts of each of the rows 12 and 14 are interconnected by various rods, some of which are indicated at 22.

There are two vertically spaced brackets 24 attached to each of the posts other than the end posts 16b and 16c. Each of the brackets 24 includes an arm 26 extending laterally away from each side of the post 16 to which the particular bracket is attached. There are two vertically spaced load carrying beams 28 at corresponding elevations extending horizontally along each side of each row of posts. The load carrying beams art attached to the respective arms 26 of the brackets 24 so that each of the brackets 24 supports a pair of load carrying beams 28 with one of the beams disposed on each side of the post to which the bracket is attached.

A first end post 16c in each of the rows 12 is disposed at the second end 20 of the rack 10 and the other of the end posts 16b in each row 12 is displaced from the second end 20 of the rack 10 in a direction toward the first end 18 of the rack. Brace means including the brace members 30 and 32 interconnect the end posts 16b and 16c of adjacent rows 12. There are two vertically spaced horizontally extending first brace members 30 which interconnect the first end posts 16c of the rows 12, which rows are next adjacent to the rows 14. There are also at least two vertically spaced horizontally extending second brace members 32 which interconnect the other end posts 16b of the rows 12.

The pairs of load carrying beams 28a, which are attached to the short row 14 by the brackets 24, extend from the last post 16a of the short row 14 and are attached to one of the first brace members 30, as is indicated at 34, and are attached to one of the second brace members 32, as is indicated at 36. The load carrying beams 28, which are attached to the next adjacent rows 12, are attached to one of the first brace members 30 as indicated at 38 and are attached to one of the second brace members 32 as is indicated at 40. The load carrying beams 28 extending along the next adjacent rows 12 are attached to the first and second brace members 30 and 32 adjacent the respective end posts 16c and 16b.

In addition, at least one and preferably two of the posts of each of the rows 12 and 14, which are indicated at 16d and are disposed adjacent the first end 18 of the rack, extend vertically upward beyond the remainder of the posts. The upwardly extending posts 16d of the adjacent rows 12 and 14 are interconnected by the structural means, generally indicated at 42, for providing stability of the rack. The structural means 42 includes a pair of struts 44 interconnecting respective upwardly extending posts 16d and reinforced by the truss members 46. The structural means 42 is disposed near the upper portion of the respective upwardly extending posts 16d so that a vehicle such as a fork lift truck or the like may drive into the storage rack between adjacent rows 12 and 14 and under the structural means 42 so as to deposit a pallet on and between load carrying beams 28 which are attached to respective adjacent rows. A fork lift truck, therefore, may be driven into the first end 18 of the rack but cannot pass through the rack due to the brace members 30 and 32 at the second end 20 of the rack; hence, the rack is known as a drive-in storage rack.

The invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A drive-in storage rack of the type wherein a vehicle may drive thereinto for depositing a pallet to be supported thereby, said rack comprising: a plurality of parallel rows of posts extending from a first end of said rack, at least one of said rows being a short row terminating short of the second end of said rack, the adjacent row on each side of said short row extending to the second end of said rack, bracing means disposed at the second end of said rack to interconnect said adjacent rows, and at least one load carrying beam attached to and extending along each row with the load carrying beams attached to said short row being also attached to said bracing means.

2. A drive-in storage rack of the type wherein a vehicle may be driven thereinto for depositing a pallet to be supported thereby, said rack comprising: a plurality of parallel rows of posts extending from a first end of said rack; at least one of said rows having the post therein, which is disposed closest to the second end of said rack, inwardly displaced from said second end of said rack with the rows on each side thereof including an end post disposed at said second end of said rack; brace means attached to and extending between said end posts, and at least one load carrying beam attached to and extending along each row with the load carrying beams attached to said short row being also attached to said bracing means.

3. A drive-in storage rack of the type wherein a vehicle may be driven thereinto for depositing a pallet to be supported thereby, said rack comprising: at least three parallel rows of posts with a short row disposed between first and second outer rows, at least one load carrying beam attached to and extending along each of said rows for supporting a pallet between adjacent rows of posts on load carrying beams which are at the same elevation, said first and second outer rows each including at least one additional post more than said short row, a brace attached to said additional posts and extending between said outer rows, and said load carrying beams which are attached to said short row extend from the last post in said short row and are attached to said brace for support thereby.

4. A drive-in storage rack of the type wherein a vehicle may be driven thereinto for depositing a pallet to be supported thereby, said rack comprising: a plurality of parallel rows of posts extending from a first end of said rack; at least one of said rows being a short row with the last post therein, which is the closest post of said short row to the second end of said rack, being inwardly displaced from said second end of said rack; at least one end post in each next adjacent row to said short row disposed closer to said second end of said rack than said last post of said short row; at least one load carrying beam extending along and connected to the posts of each of said next adjacent rows; at least one load carrying beam extending along and connected to the posts at each side of said short row so that a pallet may be supported on and between load carrying beams of adjacent rows; brace means connected to and extending between said end posts of said next adjacent rows; and said load carrying beams attached to said short row extending from said last post therein and attached to said brace means for support thereby.

5. A drive-in storage rack of the type wherein a vehicle may be driven thereinto for depositing a pallet to be supported thereby, said rack comprising: a plurality of parallel rows of posts extending from a first end of said rack; at least one of said rows being a short row with the last post therein, which is the closest post of said short row to the second end of said rack, being inwardly displaced from said second end of said rack; two end posts in each next adjacent row to said short row disposed closer to said second end of said rack than said last post of said short row; at least one load carrying beam attached to the respective posts of and extending along each of said next adjacent rows; at least one load carrying beam extending along each side of said short row and attached to the respective posts therein at the same elevation as the other beams so that pallets may be supported on and between load carrying beams of adjacent rows; and brace means interconnecting said end posts of said next adjacent rows; said load carrying beams attached to said short row extending from said last post therein and attached to said brace means for support thereby.

6. A drive-in storage rack as set forth in claim 5 wherein a first one of said end posts in each of said next adjacent rows is disposed at said second end of said rack and the other of said end posts in each of said next adjacent rows is displaced from said second end of said rack in a direction toward said first end of said rack.

7. A drive-in storage rack as set forth in claim 6 wherein said brace means includes a first brace member interconnecting said first end posts of said next adjacent rows and a second brace member interconnecting said other end posts of said next adjacent rows, and said load carrying beams attached to said short row extend from said last post therein and are attached to each of said first and second brace members.

8. A drive-in storage rack of the type wherein a vehicle may be driven therein for depositing a pallet to be supported thereby, said rack comprising: a plurality of parallel rows of posts extending from a first end of said rack; at least one of said rows being a short row with the last post therein, which is the closest post of said short row to the second end of said rack, being inwardly displaced from said second end of said rack; at least two end posts in each next adjacent row to said short row disposed closer to said second end of said rack than said last post of said short row; at least two vertically spaced load carrying beams attached to and extending along at least one side of said next adjacent rows; at least two vertically spaced load carrying beams extending along each side of said short row at corresponding elevations of said first beams so that a plurality of pallets may be supported between adjacent rows between a pair of load carrying beams at the same elevation; a first one of said end ports in each of said next adjacent rows being disposed at said second end of said rack and the other of said end posts in each next adjacent row being displaced from said second end of said rack in a direction toward said first end of said rack; and at least two spaced first brace members interconnecting said first end posts of said next adjacent rows and at least two spaced second brace members interconnecting said other end posts of said next adjacent rows; said load carrying beams attached to said short row being grouped in pairs comprising a load carrying beam extending along each side of said short row with each of said pairs of load carrying beams extending from said last post of said short row and attached to one of said first brace members and to one of said second brace members for support thereby.

9. A drive-in storage rack of the type wherein a vehicle may be driven thereinto for depositing a pallet for support by said rack which comprises: a plurality of parallel rows of vertical posts with said rows disposed between first and second ends of said rack; at least one of said rows being a short row with the last post therein, which is the closest post of said short row to said second end of said rack, being inwardly displaced from said second end of said rack; at least two end posts in each next adjacent row to said short row being disposed closer to said second end of said rack than said last post of said short row; at least two vertically spaced brackets attached at corresponding elevations to each of said posts other than said end posts, each of said brackets including an arm extending laterally from each side of said posts; at least two vertically spaced load carrying beams extending horizontally along each side of said posts and attached to respective arms of said brackets so that each of said brackets supports a pair of load carrying beams with one of said beams disposed on each side of the post to which the bracket is attached; a first one of said end posts in each of said next adjacent rows being disposed at said second end of said rack and the other of said end posts in each next adjacent row being displaced from said second end of said rack in a direction toward said first end of said rack; and at least two vertically space horizontally extending first brace members interconnecting said first end posts of said next adjacent rows and at least two vertically spaced horizontally extending second brace members interconnecting said other end posts of said next adjacent rows; said pairs of load carrying beams, which are attached to said short row by said brackets, extend from said last post of said short row and are attached to one of said first brace members and to one of said second brace members; said pairs of load carrying beams, which are attached to said next adjacent rows, are attached to one of said first brace members and to one of said second brace members adjacent said end posts.

10. A drive-in storage rack as set forth in claim 9 wherein at least one of said posts of each of said rows is disposed adjacent said first end of said rack and extends vertically upward beyond the remainder of said posts with the upwarly extending posts of adjacent rows interconnected by structural means near the upper portion thereof for providing stability of said rack.

References Cited
UNITED STATES PATENTS

| | | | |
|---|---|---|---|
| 2,945,596 | 7/1960 | Higgins | 211—134 |
| 2,963,169 | 12/1960 | Konstant | 211—134 |
| 2,968,409 | 1/1961 | Jurechko | 211—134 |
| 2,986,284 | 5/1961 | Colbert | 211—134 |
| 3,144,944 | 8/1964 | McConnell | 211—148 |
| 3,266,635 | 8/1966 | McConnell | 211—148 |

ROY D. FRAZIER, *Primary Examiner.*

CLAUDE A. LE ROY, *Examiner.*

W. D. LOULAN, *Assistant Examiner.*